Patented Sept. 10, 1946

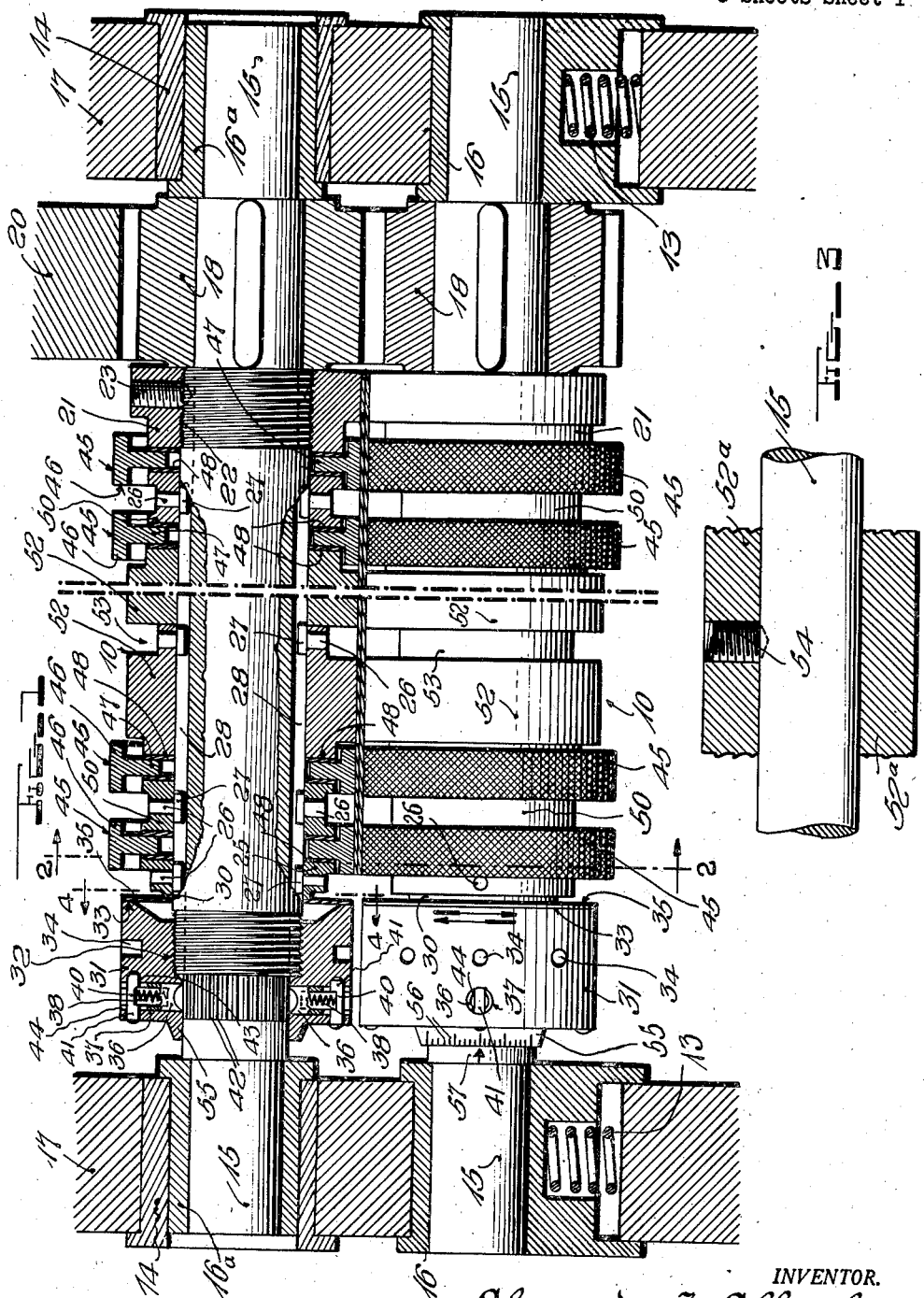

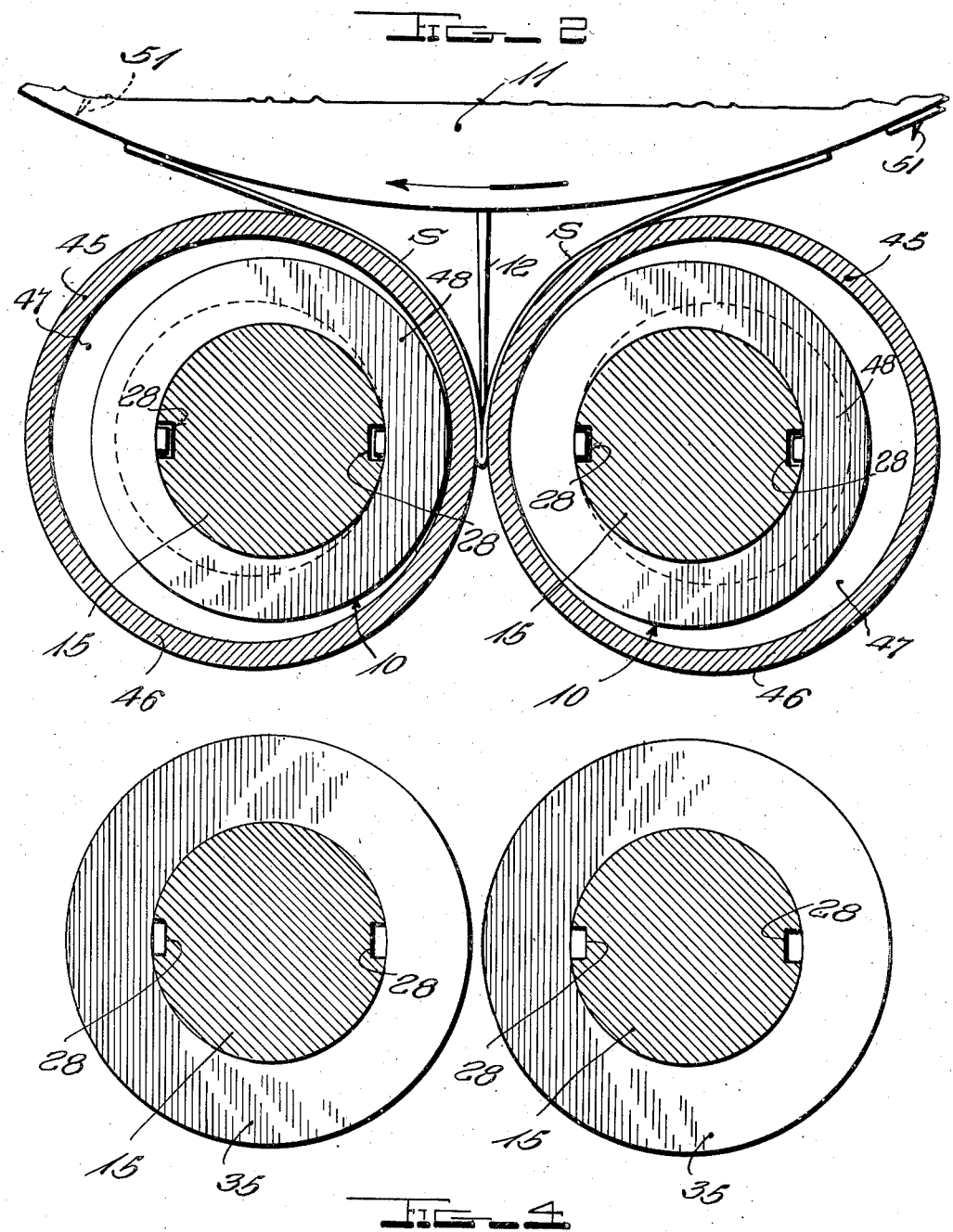

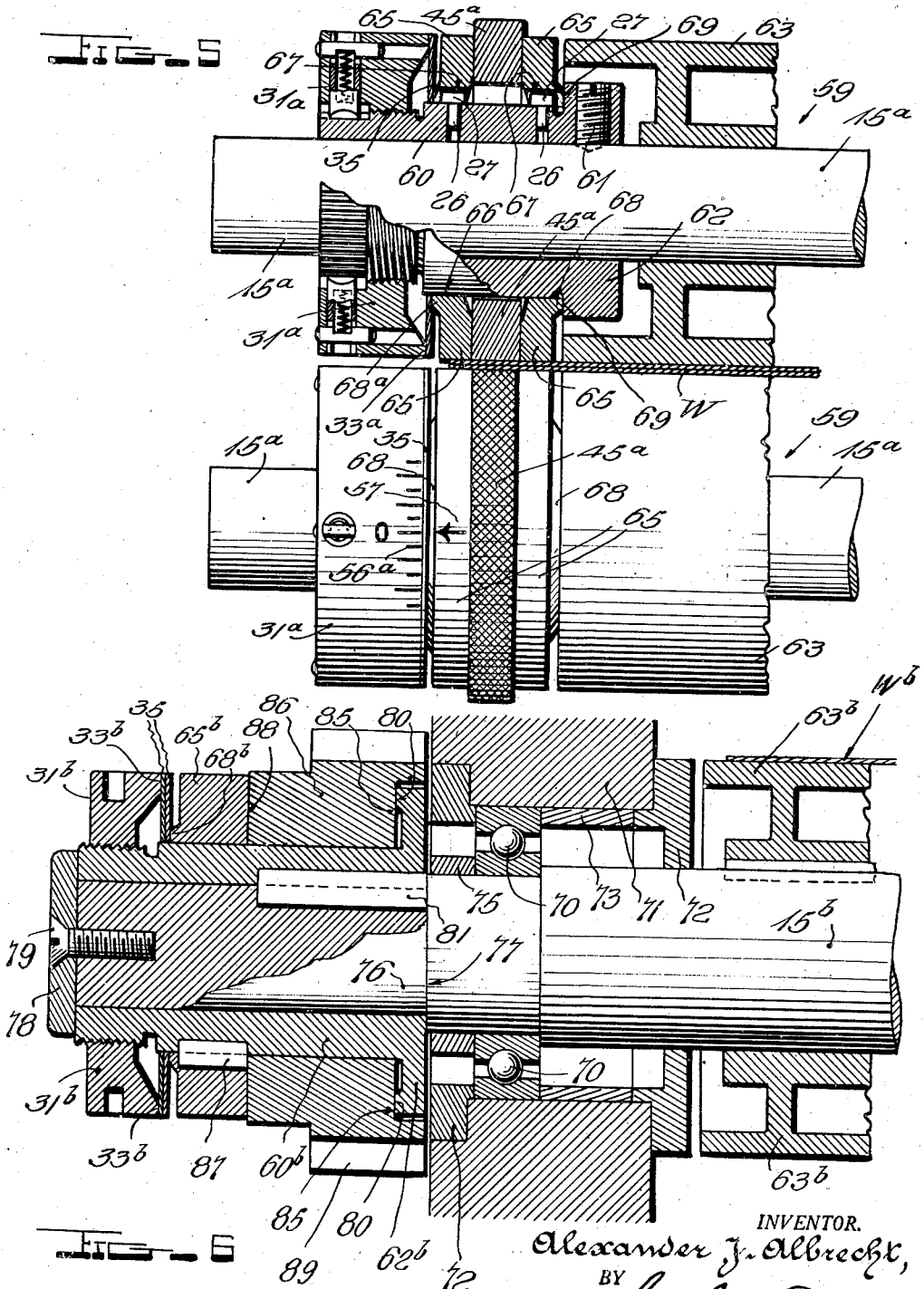

2,407,239

UNITED STATES PATENT OFFICE 2,407,239

FRICTION DRIVE FOR WEB PROPELLING ROLLERS

Alexander J. Albrecht, West New York, N. J., assignor to R. Hoe & Co., Inc., New York, N. Y., a corporation of New York Application October 9, 1942, Serial No. 461,477

5 Claims. (Cl. 271—2.3)

This invention relates to web-propelling and folding rollers for use in printing machines, and more particularly to an improved slip clutch or drive mechanism for yieldingly driving a rotatable web or sheet engaging member from a positively driven rotary drive.

In propelling and folding webs or sheets of paper or other flexible material in modern printing machines, it is highly advantageous to employ rollers herein referred to as web engaging rollers which have frictionally driven components or radially yieldable frictionally driven components which engage the webs or sheets, said components being yieldably driven so that their peripheral speed will conform to the linear speed of the engaged webs or sheets, independently of the operating speed of the drive. Such mechanisms are disclosed in United States Patents of Fred Gitzendanner No. 1,827,359, granted October 13, 1931, and William F. Huck No. 2,291,627, granted August 4, 1942.

It is, therefore, an object of this invention to provide an improved drive or clutch for web propelling, nipping or folding rollers for use in printing machines in which webs and sheets that may be cut from webs are propelled through the machine, and in which the improved clutch frictionally connects a positively driven rotary drive with a rotary web engaging member to yieldingly drive the web engaging member so that the peripheral speed of the web engaging member conforms to the linear speed of the engaged web or sheets.

Another object of this invention is to provide an improved friction drive or clutch for web propelling or folding rollers for use in printing machines, each roller including a rotatable shaft, a friction member rotatable with the shaft and movable axially thereon, a rotatable web engaging member or roller supported by the shaft, a rotary positively driven member supported by the shaft, and means supported by the shaft for biasing the friction member into engagement with the driven member to thereby yieldingly drive the web engaging member, the said bias-imparting means being constructed and arranged to occupy the minimum axial space relative to the shaft.

A further object of this invention is to provide an improved friction drive or clutch for web propelling or folding rollers for use in printing machines, each roller including a rotatable shaft, a friction member rotatable with the shaft and movable axially thereon, a rotatable web engaging member or roller supported by the shaft, a rotary positively driven member supported by the shaft, a normally flat relatively thin, spring ring surrounding the shaft and engaging the friction member, and a nut adjustable on the shaft and engaging the spring ring to exert force thereagainst, to bias the friction member axially into engagement with the driven member and thereby yieldingly rotate the web engaging member.

An additional object of this invention is to provide an improved friction drive or clutch for web propelling or folding rollers for use in printing machines, each roller including a rotatable shaft, a friction member rotatable with the shaft and movable axially thereon, a rotatable web engaging member or roller supported by the shaft, a rotary positively driven member supported by the shaft, a normally flat spring ring surrounding the shaft and having a peripheral portion engaging the friction member, and an adjusting nut movable along the shaft and engaging the spring ring to exert pressure thereagainst, to bias the friction member into frictional engagement with the driven member and thereby yieldingly rotate the web engaging member so that the peripheral speed of the web engaging member conforms to the linear speed of the engaged web.

It is also an object of this invention to provide a roller and drive of generally improved construction, whereby the device will be simple, durable and inexpensive in construction, as well as convenient, practical, serviceable and efficient in its use.

With the foregoing and other objects in view, which will appear as the description proceeds, the invention resides in the combination and arrangement of parts and in the details of construction hereinafter described and claimed, it being understood that various changes in form, proportion and minor details of construction may be made within the scope of the claims without departing from the spirit or sacrificing any advantages of the invention.

For a complete disclosure of the invention, a detailed description thereof will now be given in connection with the accompanying drawings forming a part of the specification, wherein:

Figure 1 is a partly sectional view in a horizontal plane, and depicting improved web propelling or folding-off rollers for use in a printing machine;

Figure 2 is a vertical sectional view taken on the line 2—2 of Figure 1, and diagrammatically depicting the cooperable relationship between the improved folding-off rollers and the conventional folding cylinder of a printing machine;

Figure 3 is a fragmental longitudinal sectional view depicting a slight modification in a component of the folding-off roller;

Figure 4 is a vertical sectional view taken on the line 4—4 of Figure 1.

Figure 5 is a fragmentary longitudinal sectional view, parts appearing in elevation, depicting modified web propelling or nipping rollers; and Figure 6 is a fragmentary longitudinal sectional view taken through an improved web propelling or drag roller of a printing machine.

Referring to the drawings, in which similar reference characters designate corresponding parts, there is depicted, in Figures 1 and 2, coacting folding-off or nipping rollers 10, which cooperate with a conventional folding cylinder 11, which is diagrammatically depicted in Figure 2, to receive sheets therefrom, and to fold them transversely, in conformity with the usual practice well understood by those skilled in the art. A conventional folding blade 12, operably supported by the folding cylinder 11, tucks the sheets carried by the folding cylinder to a point between the coacting folding-off rollers 10 where the sheets S are folded transversely. Finally the sheets are fed or propelled to the conventional delivery mechanism, not shown.

Each improved folding-off roller 10 includes a shaft 15 which has its terminals rotatably supported in bearings carried by the machine frame 17, which bearings may be of any preferred type. In conformity with general practice, it is desirable that at least one of the rollers 10 be supported in yieldable bearings in order to prevent damage to the machine in case of a choke. As herein shown, the shaft 15 of one of the rollers 10 is supported in blocks 16 each fitted to slide in an aperture in the frame 17, and these blocks are each pressed by a spring 13 to yieldingly hold it in one end of the aperture. The other shaft 15, as herein shown, is supported in bearing bushings 16a each of which in turn is carried by an eccentric bushing 14, rotation of which permits adjustment of the separation of the rollers 10 to provide for variation in thickness of the products passing between them. Each shaft 15 has a pinion 18 keyed or otherwise secured thereto, and these pinions intermesh so that both shafts 15 rotate in unison. Any suitable means may be employed to drive the pinions 18, and in the present arrangement there is depicted a gear 20 which meshes with one of the pinions 18, and this gear may be driven by any suitable drive component, not shown, of the machine.

Each shaft 15 has a fixed collar 21 threadedly secured thereto adjacent one terminal, as indicated at 22, and the collar 21 is held against rotation relative to the shaft by a set screw 23. A slidable collar 25 surrounds the shaft 15 adjacent its opposite terminal, and although this collar is free to slide longitudinally along the shaft, it is held against rotative movement relative thereto by pins or keys 26 which are received within apertures formed in the collar. Each pin is provided with an enlarged rectangular head 27 which is slidably received in a keyway 28 formed in the shaft 15. The outer face of the slidable collar 25 is provided with a flange or projection 30, which cooperates with components of the device hereinafter disclosed.

An adjusting nut 31 is threadedly secured to the shaft 15, as indicated at 32, and a flange or projection 33 extends inwardly from the peripheral portion of this nut. This flange 33 engages and forms a seat for the outer edge of a flat spring ring 35, which surrounds the shaft 15, and its inner edge engages the annular flange 30 of the slidable collar 25 which forms a seat for it.

The adjusting nut 31 is normally held against rotation relative to the shaft 15 by means of plungers 36, which are slidably movable in radially-extending apertures 37 formed in the nut. Each plunger 36 receives a helical extension spring 38 therein, and the outer end of each spring engages a flat portion 40 formed on a retaining pin 41, so that the beveled inner end of each plunger 36 is yieldingly forced into engagement with axially-extending grooves 42 cut in the shaft 15. Each pin 41 is received within a cylindrical aperture 43 formed in the nut 31, and also in a longitudinally-extending recess 44 formed in the outer end of each plunger 36 to hold the plunger against rotation, so that the beveled inner end of each plunger will be disposed parallel with the grooves 42 in the shaft 15. By this arrangement the nut 31 is held in any selected angular position relative to the shaft 15, for a reason to be hereinafter explained. Although the nut 31 is normally held against rotation on the shaft 15, it may be rotated relative thereto by applying sufficient turning force to the nut to overcome the restraint of the yieldable plungers 36; therefore the nut 31 is preferably provided with holes 34 for the reception of a spanner wrench, not shown, in order that the wrench may be employed to rotate the nut against the restraining action of the plungers. As the nut 31 rotates, its threads move longitudinally along the threads of the shaft 15, so that the longitudinal position of the nut on the shaft may be adjusted to exert the required force on the peripheral portion of the spring ring 35, for a purpose to be hereinafter given.

Two roller rings or bearers 45 are located adjacent each terminal of the shaft 15, and each bearer is T-shaped in cross section to provide a widened peripheral portion 46 and an inwardly projecting flange 47. The annular faces of the flanges 47 of the bearers 45 engage flat annular bearing or friction rings 48 which are secured to the fixed and slidable collars 21 and 25. The rings 48 are preferably formed of bronze or other suitable wear-resisting material. Although the two bearers 45 are preferably provided at each end of each composite folding-off roller, it is to be understood that any desired number of bearers may be used.

A spacing sleeve 50 surrounds the shaft 15 intermediate the bearers 45 of each pair of bearers, and each sleeve 50 has bearing or friction rings 48 secured to its faces, which rings engage the flanges 47 of the bearers 45.

A plurality of sleeves 52 are supported on the shaft 15 between the inner bearers 45, and the sleeves 50 and 52 are mounted for free longitudinal movement on the shaft 15, but they are held against rotation relative thereto by pins 26 which are received in apertures formed in the sleeves 50 and 52, and their rectangular heads 27 are received within the keyways 28. The outer face of each outer sleeve 52 has a bearing or friction ring 48 secured thereto, and these rings engage the flanges 47 of the inner bearers 45. Any preferred number of sleeves 52 may be provided for each composite roller, and the end face of one sleeve abuts the end face of the adjacent sleeve to thereby space the bearer rings 45 a predetermined distance apart. The sleeves 50 and 52 have recesses 53 formed in their peripheral portions in order that the conventional sheet-holding pins 51, diagrammatically indicated in Figure 2, may freely pass the folding-off rollers during the operation of the machine. The operation and function of the pins 51 are well known and understood by those skilled in the art, consequently the diagrammatic illustration is sufficient for this application.

The outer diameter of each bearer 45 is slightly greater than the outer diameter of the sleeves 52, and the inner diameter of each bearer 45 is somewhat greater than the diameter of the shaft 15, so that the bearers are supported on the shaft in floating relation, for a purpose to be hereinafter set forth.

The degree of adjusting movement of the nut 31 may be readily determined by a calibrated arrangement which includes a scale inscribed on the periphery of a projection 55 which extends axially from the nut 31. The scale includes numbered graduated lines or marks 56 arranged to register with an index 57 inscribed on the shaft 15. By this arrangement, the nut 31 may be readily adjusted to any selected angular position with relation to the shaft 15.

In the operation of the improved folding-off rollers 10, the cooperating bearers 45 of the opposed folding-off rollers engage the sheets S and propel them from the point of delivery by the folding blade 12 past the bite of the bearers 45, where the sheets are folded, and then deposit the sheets on a conventional conveyor, not shown. Inasmuch as the bearers 45 are of greater diameter than the folding-off rollers, these bearers are constantly forced into engagement with the sheets, irrespective of the thickness of the product. The folding-off rollers are preferably adjusted so that the outer peripheral faces of the sleeves 52 are positioned close to the sheets, and, in this position, the bearers 45 are forced by their engagement with the sheets to a position of eccentricity relative to the shafts 15, but this action is resisted by the frictional engagement between the flanges 47 of the bearers 45 and the coacting friction rings 48, and thus, by rotation of the rollers, the product is constantly and firmly engaged by the coacting bearers.

The use of the relatively thin flat spring rings 35 permits the employment of any number of rings without greatly increasing the space required. By this arrangement, any desired pressure may be exerted against the movable collar 25 by simply rotating the adjusting nut 31, which rotation is permitted by the yieldability of the securing plungers 36.

The use of a plurality of flat spring rings permits choice of the number of spring rings best suited to produce the required pressure desired. This is not possible when helical springs are employed, because similarly disposed helical springs in axial alignment obviously would not produce the requisite pressure. The flat spring ring also has characteristics which give a relatively constant percentage of change of load for a given increment of deflection at any point within the deflection limit, thus facilitating adjustment at both heavy and light loads. In the use of coil or helical springs, a given change in deflection anywhere within the deflection limit gives a constant change in load and, consequently, the sensitivity of adjustment is lost at light loads. The load capacity of a flat spring ring is relatively high, considering the small space required for its employment. In a spring of this type the load is distributed more uniformly over the friction imparting members, because the load required to straighten out any initial irregularities in the spring ring is very small, and additional loading is evenly distributed over the loading members. If a helical spring is employed, the loading of the friction member is uneven due to the difficulty of forming the spring terminals so that they are accurately perpendicular to their axes, and because irregularities at the dead ends of these springs localize the load and cause uneven loading. When a plurality of helical springs are employed, they are not usually uniform and consequently impart unequal forces which prevent their proper functioning.

Although a number of sleeves are preferably employed in rollers of this character, it is to be understood, of course, that a single sleeve may be interposed between the inner bearers 45.

In some instances, it is desirable to provide the adjusting mechanism at each end of each roller 10, so that more tension may be imparted to the bearers 45 at one end of the roller 10 than at the other. In such arrangement, the sleeve 52a (Figure 3) is securely locked to the shaft by a set screw 54, or other suitable securing means. Again a single sleeve may be positioned between the inner bearers 45, and locked to the shaft 15 in a manner disclosed in Figure 3.

A modified form of the invention is depicted in Figure 5, in which the invention is incorporated in web propelling or nipping rollers 59 usually employed in printing machine folders below the conventional former, the use and function of such rollers being well understood by those skilled in the art.

Each roller 59 includes a driven shaft 15a which has a cylindrical sleeve 60 rigidly secured thereto by a set screw 61, which is threaded through a laterally enlarged flange or head 62 formed at the inner end of each sleeve 60. In the preferred arrangement, a sleeve 60 is positioned adjacent each end of the shaft 15a, and a tubular body member 63 is carried by the shaft between the spaced sleeves 60, and the member 63 is suitably secured to the shaft 15a so that it rotates therewith. Inasmuch as both ends of each roller 59 are similar, only one end has been illustrated. Spaced rings or collars 65 are supported on a cylindrical surface 66 of the sleeve 60 for longitudinal sliding movement, but each collar 65 is held against rotation relative to the sleeve 60 by a pin 26 which is received within an aperture formed in the sleeve 60, and its enlarged rectangular head 27 is received within a keyway 67 formed in the collar. A bearer 45a surrounds the peripheral surface 66 of the sleeve 60 and is positioned between the collars 65, with the inner faces of the collars 65 frictionally engaging the outer faces of the bearer 45a. Each inner collar 65 is provided with an annular projection 68 which engages a face 69 formed on the head 62. Each outer collar 65 is provided with a similar projection 68a which is engaged by the inner portion of a flat spring ring 35, and the outer portion of the spring ring 35 is engaged by the projection 33a of an adjusting nut 31a, substantially similar to the nut hereinbefore described.

In this arrangement, each adjusting nut 31a may be rotated in the manner hereinbefore described, to adjustably move the nut longitudinally with relation to the sleeve 60 to thereby exert the requisite force on the outer portion of the spring 35, and the spring 35, in turn, imparts pressure to each outer collar 65, so that each bearer 45a is frictionally engaged by the collars 65. The outer diameter of the bearers 45a is somewhat greater than the outer diameter of the body member 63 and collars 65, and the inner diameter of the bearers 45ª is sufficiently greater than the diameter of the cylindrical portion of the sleeve 66, so that the opposed yieldable frictionally-held bearers 45ª of a pair of nipping rollers 59 will coact to engage webs W running between the coacting nipping rollers as hereinbefore described, to thus propel the webs.

The degree of adjusting movement of the nut 31ª may be readily determined by inscribing a calibrated scale 56ª on the nut 31ª for registration with an index mark 57 inscribed on the outer collar 65, in a manner hereinbefore disclosed.

In Figure 6 there is depicted a drag roller for use in a printing machine over a conventional former, and this roller includes a shaft 15ᵇ which has a roller body 63ᵇ rigidly secured thereto, and the shaft is rotatably supported by antifriction bearings 70 carried by side members 71 of the machine frame, and the bearings are retained in their operable position by bearing retainer members 72 and spacing rings 73 and 75. Similar bearings 70 are provided at each end of the shaft 15ᵇ, but inasmuch as these bearings are alike only one end of the shaft is shown.

The terminal portion of the shaft 15ᵇ at its drive end is reduced, as indicated at 76, to support thereon a sleeve 60ᵇ. The sleeve 60ᵇ is held against axial movement on the reduced portion 76 of the shaft between a shoulder 77 and a retaining washer 78. The retaining washer is secured to the terminal of the shaft by a screw 79, or other suitable securing device, and the sleeve 60ᵇ is held against rotation relative to the shaft 15ᵇ by a key 81. The sleeve 60ᵇ is provided with a flange 62ᵇ at its inner end, having a clutch face 80 which frictionally engages a clutch surface 85 formed on the inner face of a gear 86, which is rotatably supported on the sleeve 60ᵇ.

A collar or ring 65ᵇ is mounted for longitudinal movement on the sleeve 60ᵇ, but this collar is held against rotative movement relative to the sleeve 60ᵇ by a key 87, or other suitable securing device. The inner face of the collar 65ᵇ engages the outer face 88 of the gear 86, so that it is frictionally engaged on each side. The gear 86 is provided with teeth 89 which mesh with similar teeth on a drive gear not shown, which may be driven from any convenient drive component of the machine.

An annular projection 68ᵇ extends outwardly from the collar 65ᵇ, and engages the inner portion of a flat spring ring 35. This spring ring is, in this instance, disposed in face to face abutting relation with a second similar spring ring, and the outer portion of the second ring is engaged by an annular projection 33ᵇ which extends inwardly from an adjusting nut 31ᵇ, substantially similar to the adjusting nuts hereinbefore described.

In operation, the engagement of the clutch faces 85 and 88 of the gear 86 with the clutch face 80 and clutch face of the collar 65ᵇ causes the gear 86 to drive the shaft 15ᵇ and roller 63ᵇ until a predetermined resistance is exerted on the roller 63ᵇ, and then the gear will slip to permit the roller to conform to the speed of the web Wᵇ which is wrapped about the roller body 63ᵇ, in conformity with the usual practice in guiding and propelling webs through a printing machine. By this arrangement the roller body 63ᵇ may exert sufficient torque pull or "drag" on the web to propel or feed it, but the torque imparted to the roller body 63ᵇ will not be sufficient to cause the roller to slip or move relative to the web, so that the peripheral speed of the roller, as hereinbefore stated, always conforms to the linear speed of the web. In propelling different numbers of webs, the degree of torque imparted to the roller is varied to conform to the required drag or torque pull, and the degree of torque may be readily controlled by adjusting the nut 31ᵇ to impart the desired force to the spring rings 35 to thus cause the springs to exert the requisite pressure on the slidable collar 65ᵇ.

In the arrangements herein disclosed, duplicate rollers simultaneously engaging the opposite sides of the web are shown, although under certain conditions satisfactory operation can be obtained by the use of a solid roller engaging one side of the product, and a roller of one of the forms herein shown engaging the opposite side of the product instead.

It will be understood that the invention may be embodied in other specific forms without departing from the spirit or essential attributes thereof, and it is therefore desired that the present embodiment be considered in all respects as illustrative and not restrictive.

What I claim is:

1. In a material propelling roller for printing or folding machines, a rotatable shaft, a rotary material engaging member supported by and rotatable with the shaft, a sleeve rotatable with the shaft and having a friction face, a driven member rotatable about the sleeve and having a friction surface, a friction collar supported relative to and rotatable with the shaft and movable in the direction of the axis of the shaft, an adjusting member supported relative to the shaft and movable in the direction of the axis of the shaft, and a flat spring ring normally disposed entirely in a plane perpendicular to the axis of the material engaging member and surrounding the shaft and operably interposed between the adjusting member and the collar whereby axial movement of the adjusting member causes the spring ring to bias the collar for movement towards the said friction face to thereby press the driven member between the collar and the friction face and yieldingly drive the material engaging member when the driven member is rotated, the adjusting member engaging the spring to constantly bias the spring against the collar and the degree of constant bias of the spring against the collar being determined by the degree of adjusting movement of the adjusting member.

2. In a material propelling roller, a rotatable shaft, a material engaging member carried by and rotatable with the shaft, a sleeve secured to and supported by the shaft and having a flat clutch face, a driven member having opposite clutch faces and rotatably supported by the sleeve, a collar rotatable with the sleeve and slidable axially thereon, an adjusting member threadedly secured to the sleeve and movable axially along the sleeve when rotated relatively thereto, and a flat spring ring normally disposed entirely in a plane perpendicular to the axis of the material engaging member and surrounding the sleeve and operably interposed between the adjusting member and the collar to bias the collar for axial movement towards the said flat clutch face to frictionally connect the driven member with the sleeve to thereby yieldingly rotate the shaft and material engaging member, the adjusting member engaging the spring to constantly bias the spring against the collar and the degree of constant bias of the spring against the collar being determined by the degree of adjusting movement of the adjusting member.

3. In a material propelling roller, a rotatable shaft, a material engaging member carried by and rotatable with the shaft, a sleeve supported by and secured to the shaft and having a flat clutch face, a driven member having opposite clutch faces and rotatably supported by the sleeve, a collar rotatable with the sleeve and slidable axially thereon, an adjusting member threadedly secured to the sleeve and movable axially along the sleeve when rotated relatively thereto, and a flat spring ring normally disposed entirely in a plane perpendicular to the axis of the material engaging member and surrounding the sleeve and operably interposed between the adjusting member and the collar to bias the collar for axial movement towards the said flat clutch face to frictionally connect the driven member with the sleeve to thereby yieldingly rotate the shaft and material engaging member, and yieldable means for securing the adjusting member against unintentional rotation relative to the sleeve, the adjusting member engaging the spring to constantly bias the spring against the collar and the degree of constant bias of the spring against the collar being determined by the degree of adjusting movement of the adjusting member.

4. In a material propelling roller, a rotatable shaft, a material engaging member carried by and rotatable with the shaft, a sleeve supported by and secured to the shaft and having a clutch face, a driven member rotatably supported by the sleeve and having opposite clutch faces, a collar supported by and rotatable with the sleeve and slidable axially thereon, the collar having a flat clutch face, an adjusting nut threadedly secured to the sleeve and movable axially along the sleeve when rotated relatively thereto, a flat spring ring normally disposed entirely in a plane perpendicular to the axis of the material engaging member and surrounding the sleeve and operably interposed between the adjusting member and the collar to bias the collar for axial movement towards the said driven member to frictionally engage the clutch faces of the sleeve and collar with the clutch faces of the driven member to thereby yieldingly rotate the shaft and material engaging member, and means for securing the adjusting member against unintentional rotation relative to the sleeve, the adjusting member engaging the spring to constantly bias the spring against the collar and the degree of constant bias of the spring against the collar being determined by the degree of adjusting movement of the adjusting member.

5. In a web propelling roller for a printing machine, a rotary material engaging member adapted to propel the engaged web, a rotary driven member, a rotary and slidable collar, a movable adjusting member, and a slidable flat spring ring normally disposed entirely in a plane perpendicular to the axis of the web engaging member and operably interposed between the adjusting member and the collar and operably engaged by the adjusting member and collar respectively adjacent its outer and inner peripheral edges to bias the collar for movement to frictionally connect the driven member and web engaging member and yieldingly drive the web engaging member, the adjusting member engaging the spring to bias the spring against the collar and the degree of bias against the collar being determined by the degree of adjusting movement of the adjusting member from normal flat condition of the spring to a deflected condition within the elastic limit of the spring, the spring having a relatively constant percentage of change of load for a given increment of deflection at any point within the range of deflection adjustment.

ALEXANDER J. ALBRECHT.